(12) United States Patent
Dextraze et al.

(10) Patent No.: US 10,826,353 B2
(45) Date of Patent: Nov. 3, 2020

(54) LIQUID COOLED ELECTRIC MACHINE WITH ENCLOSED STATOR

(71) Applicant: TM4 INC., Boucherville (CA)

(72) Inventors: Jean-Philippe Dextraze, Delson (CA); Éric Latulipe, Ste-Julie (CA); Yannick Philibert, Boucherville (CA); Martin Houle, Laval (CA)

(73) Assignee: DANA TM4 INC., Boucherville (CA)

( * ) Notice: Subject to any disclaimer, the term of this patent is extended or adjusted under 35 U.S.C. 154(b) by 134 days.

(21) Appl. No.: 16/090,792

(22) PCT Filed: Apr. 11, 2017

(86) PCT No.: PCT/CA2017/050442
§ 371 (c)(1),
(2) Date: Oct. 2, 2018

(87) PCT Pub. No.: WO2017/177321
PCT Pub. Date: Oct. 19, 2017

(65) Prior Publication Data
US 2019/0229583 A1 Jul. 25, 2019

Related U.S. Application Data

(60) Provisional application No. 62/321,376, filed on Apr. 12, 2016.

(51) Int. Cl.
*H02K 9/197* (2006.01)
*H02K 1/18* (2006.01)
(Continued)

(52) U.S. Cl.
CPC ............. *H02K 9/197* (2013.01); *H02K 1/187* (2013.01); *H02K 1/20* (2013.01); *H02K 5/18* (2013.01); *H02K 5/20* (2013.01)

(58) Field of Classification Search
CPC .......... H02K 9/197; H02K 1/187; H02K 1/20; H02K 5/18; H02K 5/20
See application file for complete search history.

(56) References Cited

U.S. PATENT DOCUMENTS 3,624,432 A 11/1971 Merz
5,363,002 A 11/1994 Hernden et al.
(Continued)

FOREIGN PATENT DOCUMENTS

CN 10 132 7731 12/2008
DE 10 2011 012453 8/2012
(Continued)

OTHER PUBLICATIONS

European Patent Office, Extended European Search Report Issued in Application No. 17781674.1, dated Nov. 5, 2019, Germany, 10 pages.
(Continued)

*Primary Examiner* — Forrest M Phillips
(74) *Attorney, Agent, or Firm* — McCoy Russell LLP

(57) ABSTRACT

An embodiment of a liquid cooled electric machine is provided with an enclosed stator and includes a cooling assembly so configured as to allow cooling liquid to flow in the coil receiving slots of the enclosed stator to thereby cool the coils positioned therein.

20 Claims, 11 Drawing Sheets

(51) Int. Cl.
*H02K 1/20* (2006.01)
*H02K 5/20* (2006.01)
*H02K 5/18* (2006.01)

(56) References Cited

U.S. PATENT DOCUMENTS

| | | |
|---|---|---|
| 8,789,435 B2 | 7/2014 | Xu et al. |
| 2002/0005671 A1 | 1/2002 | Welke et al. |
| 2017/0324309 A1* | 11/2017 | Huang .................. H02K 11/33 |

FOREIGN PATENT DOCUMENTS

| | | | |
|---|---|---|---|
| EP | 0642703 B1 | 4/1996 | |
| EP | 1627460 B1 | 11/2010 | |
| EP | 2282395 A2 | 2/2011 | |
| WO | 9324983 A1 | 12/1993 | |
| WO | 2010081216 A1 | 7/2010 | |
| WO | WO-2017192336 A1 * | 11/2017 | ............ F02B 39/005 |
| WO | WO-2017214232 A1 * | 12/2017 | ............ H02K 9/193 |

OTHER PUBLICATIONS

State Intellectual Property Office of the People's Republic of China, Office Action and Search Report Issued in Application No. 201780028067.8, dated Jan. 2, 2020, 13 pages. (Submitted with Partial Translation).

* cited by examiner

LIQUID COOLED ELECTRIC MACHINE WITH ENCLOSED STATOR

FIELD

The present disclosure generally relates to electric machines. More specifically, the present disclosure is concerned with a liquid cooled electric machine provided with an enclosed stator.

BACKGROUND

Electric machines, motors or generators, are well known in the art. It is also widely known that electric machines generate heat as a by-product and that this heat must be somehow extracted from the machine to improve the performance of the machine and/or prevent early degradation thereof.

Electric machines are often air-cooled. This is often done by providing apertures in the body of the machine to force air therethrough. The efficiency of such a cooling assembly is often poor since air is a generally low efficiency cooling medium. Furthermore, some electric machines operate in environments that are such that it is not possible to provide an electric machine with apertures to allow air therein. Accordingly, liquid cooling assemblies for electric machines have also been designed.

Some permanent magnet electric machines are provided with an internal stator and an external rotor generally enclosing the stator. When this is the case, the stator has a generally cylindrical body and coils are so mounted to the cylindrical body as to outwardly produce a magnetic field that interacts with the externally provided rotor. Since the heat is generally generated in the stator that is somewhat enclosed by the rotor, it may be difficult to install a liquid cooling assembly inside an enclosed stator of such an external rotor electric machine.

SUMMARY

The difficulty of cooling the internal stator of an electric machine is hereby solved by providing an enclosure around the stator and by providing a cooling liquid path in the enclosure. In some embodiments, the warmed cooling liquid may be cooled by an external cooling arrangement associated with the casing of the electric machine.

In accordance with an illustrative embodiment, there is provided a liquid cooled electric machine comprising an internal stator having an inner surface and an outer surface provided with coil receiving slots; an external rotor coaxial with the internal stator; and a stator cooling assembly having internal portion in contact with the inner surface of the stator, an external sleeve in contact with the outer surface of the stator to seal the coil receiving slots and an intermediate portion interconnecting the internal portion and the external sleeve; the intermediate portion being so configured as to allow cooling liquid to flow between the internal portion and the coil receiving slots; the stator cooling assembly including an inlet and an outlet.

Other objects, advantages and features will become more apparent upon reading of the following non-restrictive description of illustrative embodiments thereof, given by way of example only with reference to the accompanying drawings.

DETAILED DESCRIPTION

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The expression "electric machine" should be construed herein and in the appended claims broadly so as to include electric motors, electric generators and the like.

The expressions "connected" and "associated" should be construed herein and in the appended claims broadly so as to include any cooperative or passive association between mechanical parts or components. For example, such parts may be connected or associated together by direct coupling, or indirectly connected using further parts therebetween.

Generally stated, described herein is a liquid cooled electric machine that is provided with an enclosed stator allowing cooling liquid to contact both the inner surface and the outer surface thereof.

With reference first to FIGS. 1 to 7 of the appended drawings, a liquid cooled electric machine 10 according to a first illustrated embodiment will now be described.

Figure 1:
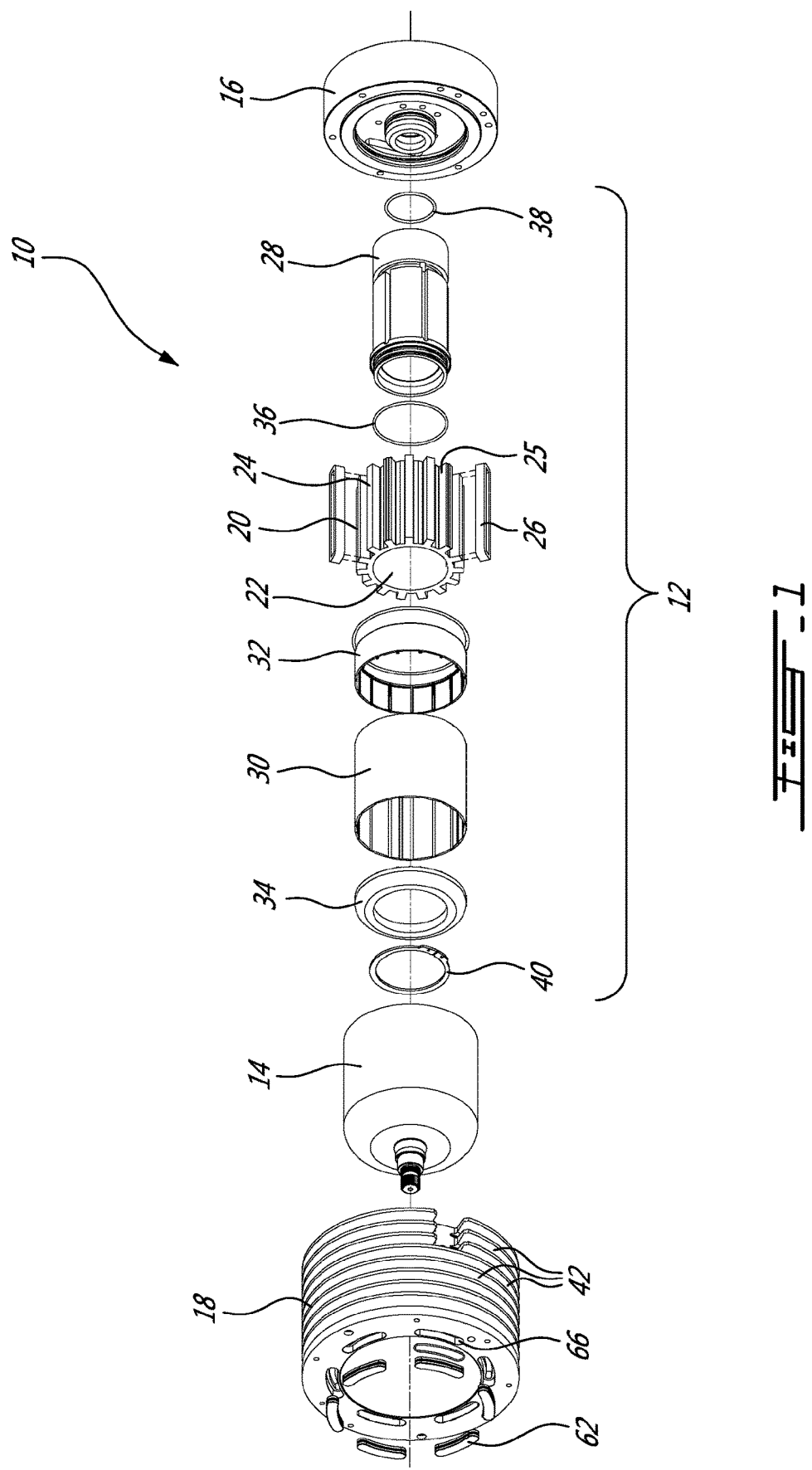
FIG. 1 is an exploded view of an electric machine including an enclosed stator according to a first illustrative embodiment.

As can be seen from FIG. 1, which illustrates the electric machine 10 in an exploded view, the liquid cooled electric machine 10 includes an internal stator 12, a rotor 14, a base 16 and a casing 18.

The internal stator 12 includes a stack of laminations 20 provided with an inner surface 22 and an outer surface 24 having longitudinal coil receiving slots 25 to allow coils 26 to be inserted therein.

The internal stator 12 also includes a stator cooling assembly enclosing the laminations 20 and coils 26. More specifically, the stator cooling assembly includes an internal portion 28 configured and sized as to be inserted in the stack of laminations 20, an external sleeve 30 configured and sized as to be applied to the outer surface of the laminations 20, a connecting element 32 used to imperviously mount the external sleeve 30 to the base 16 and an intermediate portion 34 interconnecting, in a fluid tight manner, the internal portion 28 to the external sleeve 30. Of course, O-rings 36, 38 and a clip 40 are provided to mount the various elements together and to provide fluid tightness.

The rotor 14 is schematically illustrated.

The casing 18 includes external fins 42 designed to increase the convective heat transfer between the casing and the environment to thereby improve the cooling of the warmed cooling liquid supplied by the stator cooling assembly. As will be explained hereinbelow, the casing 18 includes a liquid cooling arrangement to circulate the liquid therein.

Figure 2:
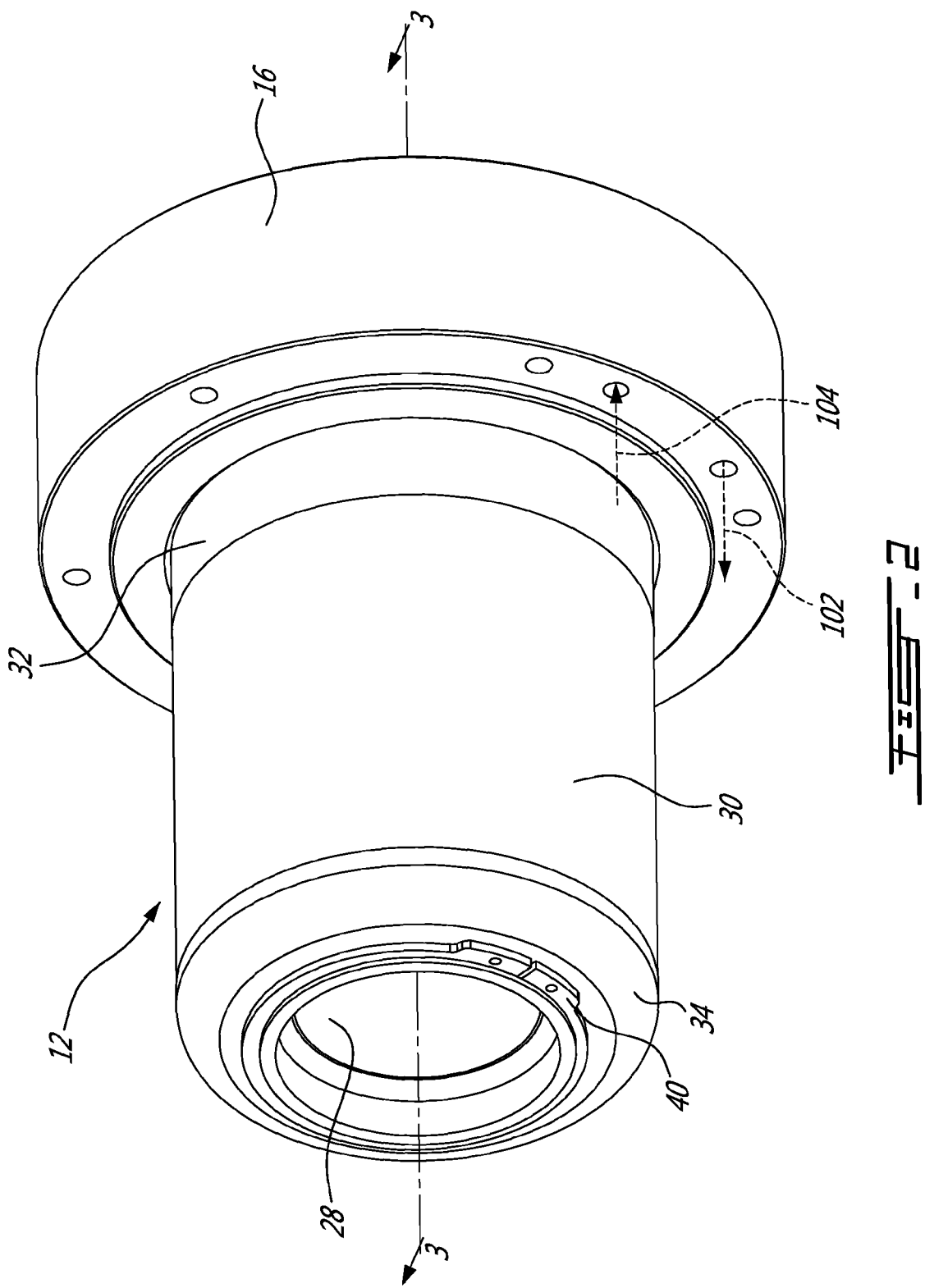
FIG. 2 is a perspective view of the enclosed stator of the electric machine of FIG. 1.

FIG. 2 illustrates the enclosed stator 12 in a perspective view.

Figure 3:
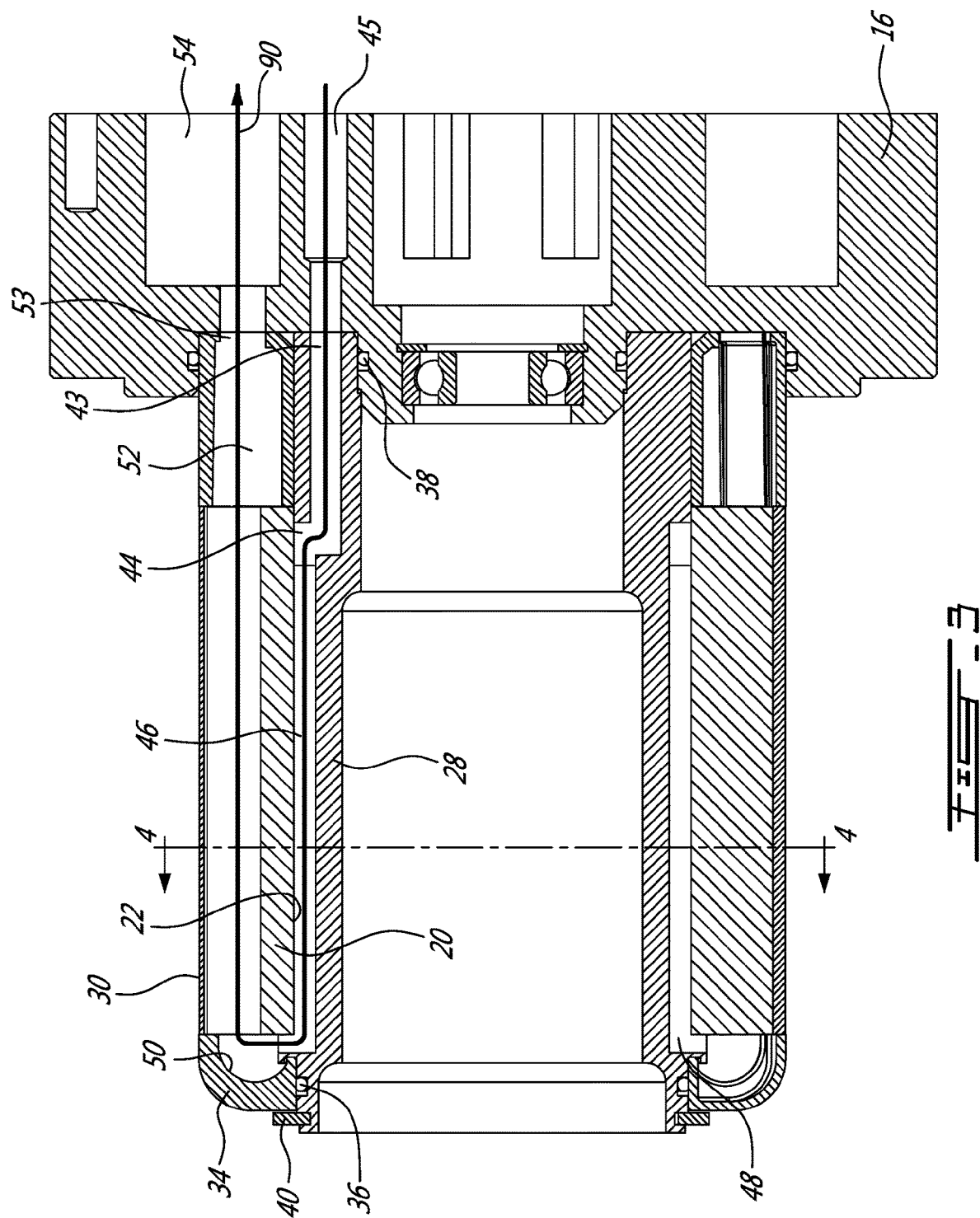
FIG. 3 is a sectional view taken along line 3-3 of FIG. 2.

FIG. 3 illustrates, in a sectional view, the flow of cooling liquid in the stator cooling assembly. As can be seen from arrow 90, the cooling liquid enters the internal portion 28 via a conduit 43 (defining the inlet of the cooling assembly), aligned with an inlet 45 of the base 16. As can be better seen from FIG. 7 that illustrates the internal portion 28 of the cooling assembly in a perspective view, the conduit 43 leads to a circumferential channel 44 to which longitudinal channels 46 are connected. The channel 44 may therefore be viewed as a manifold. Each longitudinal channel 46 ends in a bend 48. Accordingly, the cooling liquid entering the internal portion 28 of the cooling assembly is directed towards the inner surface 22 of the stack of laminations 20 by the channels 44 and 46 before exiting the internal portion 28 via the bends 48 to enter the intermediate portion 34.

As can be seen from FIG. 3, the intermediate portion 34 has a curved inner surface 50 to channel the cooling liquid towards the outer surface of the stack of laminations 20. The curved inner surface 50 also allows space for the coil heads (not shown) that often exceeds the lamination stack 20. Accordingly, the coil heads are also cooled by the flow of cooling liquid.

Figure 4:
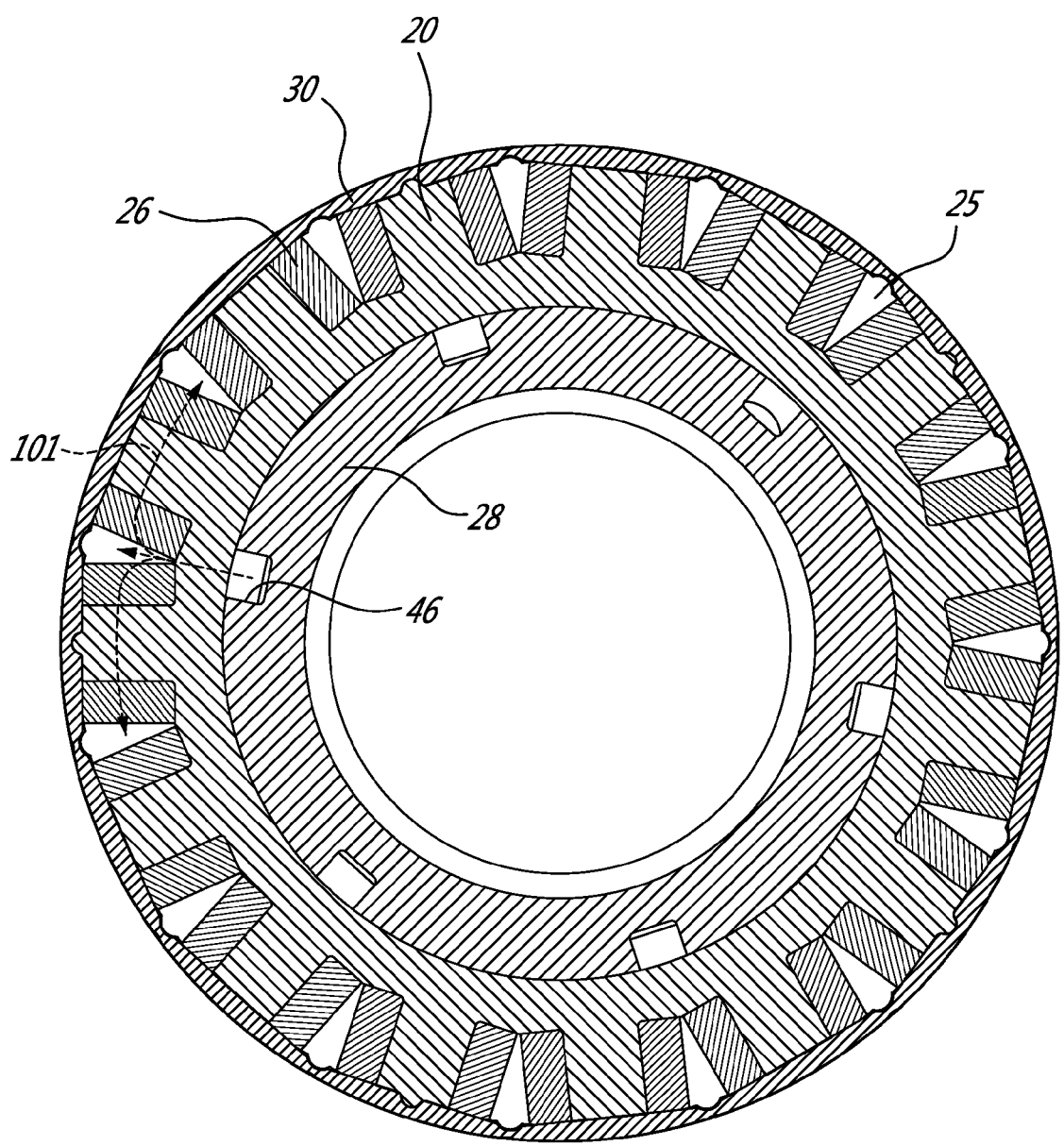
FIG. 4 is a sectional view taken along line 4-4 of FIG. 3.

As can be better seen from FIG. 4, the cooling liquid exiting the channels 46 via the bends 48 enters the space between the coils 26 to thereby cool the coils and the outer surface of the lamination stack (see arrows 101).

Returning to FIG. 3, the cooling liquid then flows in a cylindrical chamber 52 provided in the connecting element 32 before being discharged by an aperture 53 defining the outlet of the cooling assembly in a reservoir 54 in the base 16 as warmed cooling liquid.

Figure 5:
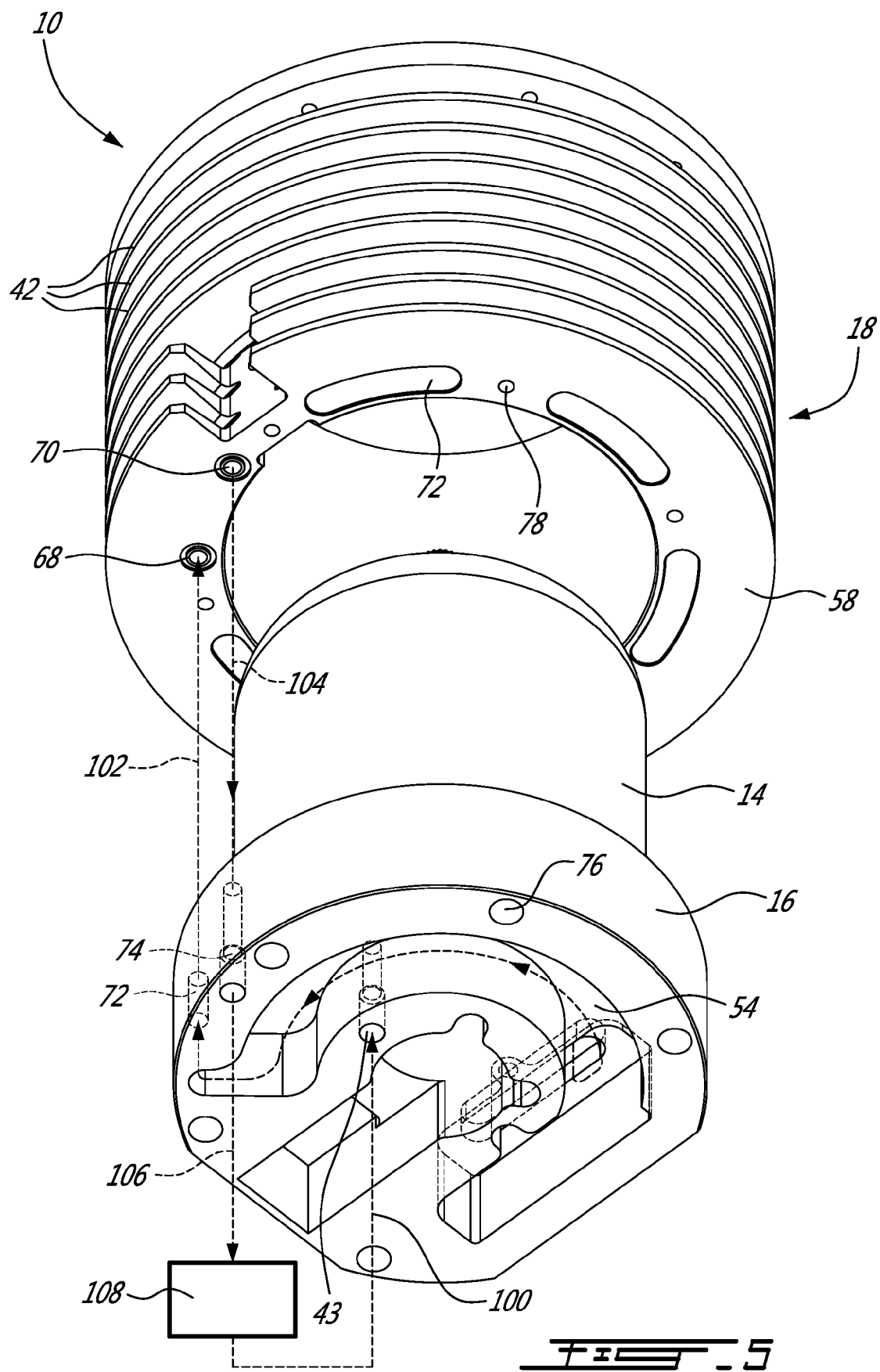
FIG. 5 is a perspective view, partially exploded of the electric machine of FIG. 1.
Figure 6:
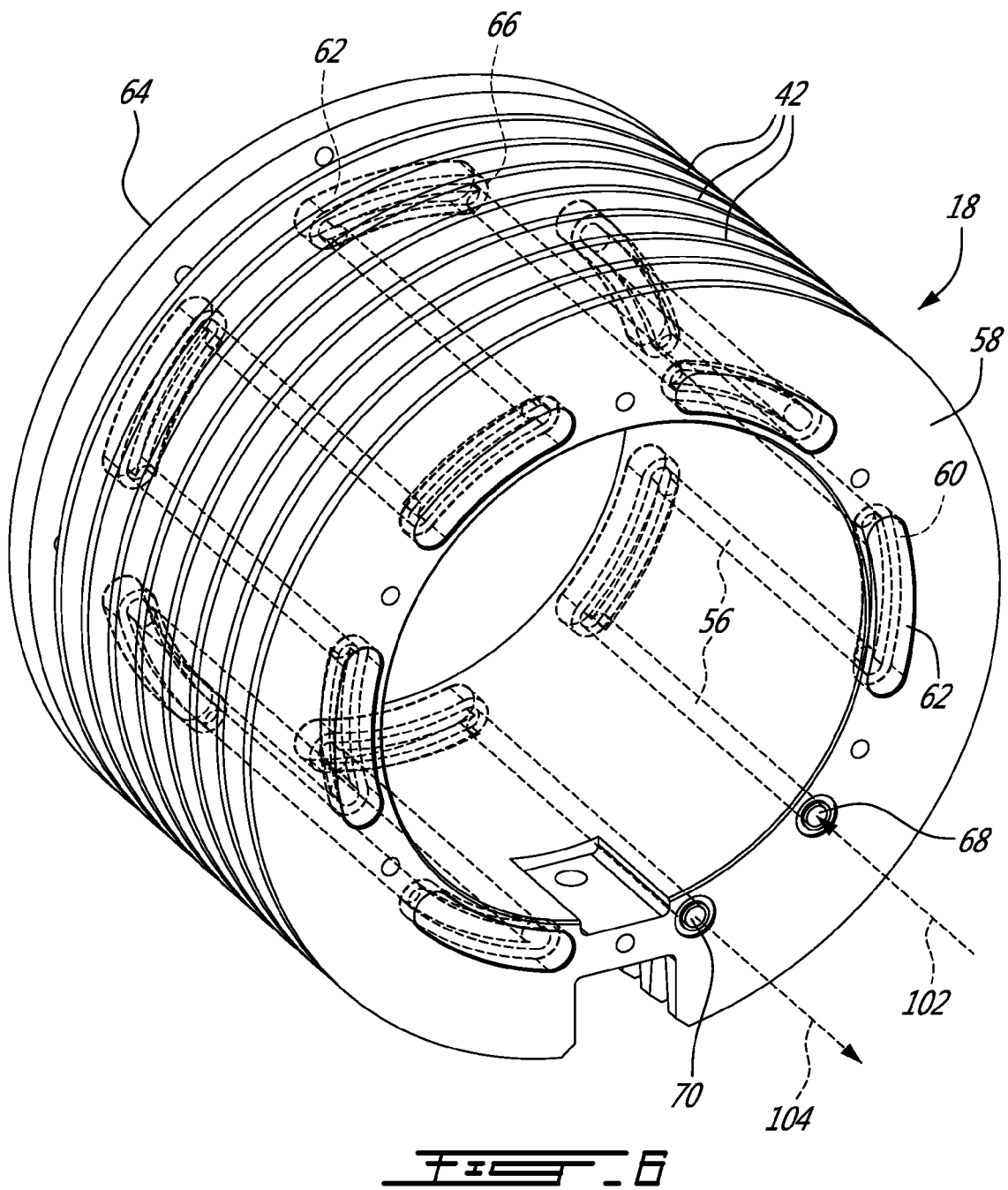
FIG. 6 is a perspective view of the casing.
Figure 7:
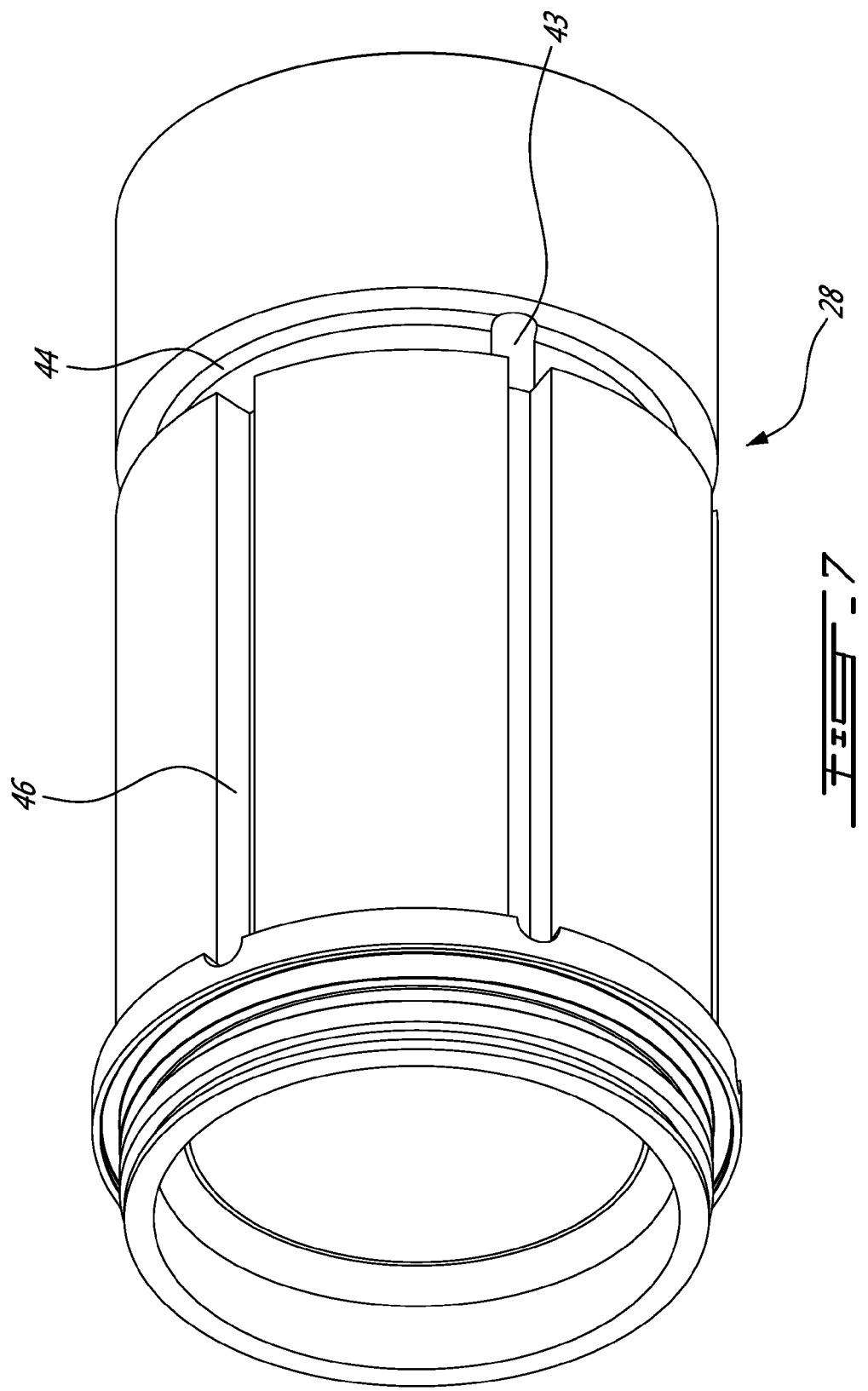
FIG. 7 is a perspective view of the internal portion of the liquid cooling assembly.

Turning now to FIGS. 5 and 6 of the appended drawings, in this first illustrative embodiment of the liquid cooled electric machine 10, the casing 18 includes a cooling arrangement used to cool the warmed cooling liquid. This cooling arrangement will now be described.

As can be seen from these figures, the casing 18 is generally cylindrical and includes external fins 42. The diameter of the central aperture of the casing 18 is such that the rotor 14 is free to rotate when the electric machine 10 is assembled.

The casing 18 is provided with a cooling arrangement including integrally formed longitudinal cooling channels 56 shown in dashed lines in FIG. 6.

The proximate longitudinal end 58 of the casing 18 includes five (5) recesses 60 (shown in dashed lines) configured and sized to receive path-forming covers 62 configured to interconnect two adjacent cooling channels 56. Similarly, the distal longitudinal end 64 of the casing 18 includes six (6) recesses 66 configured and sized to receive path-forming covers 62 also configured to interconnect two adjacent cooling channels 56. Indeed, as can be seen from this figure, the size, shape and position of the recesses 60 and 66 are such that each recess is in line with two adjacent longitudinal cooling channels 56.

Accordingly, when the covers 62 are in place in the recesses 60 and 66, the cooling arrangement is complete and a liquid tight cooling path is formed between the inlet 68 and the outlet 70.

Since the casing 18 is made of thermally conducting material, such as aluminum or aluminum alloys, for example, the warmed cooling liquid entering the inlet (see arrow 102) is cooled while it passes through the cooling path since heat is absorbed by the casing 18 that is itself cooled by the convective heat transfer from the fins 42. Accordingly, the cooling liquid exiting the casing 18 by the outlet 70 (see arrow 104) is cooler than the liquid entering via the inlet 70.

One skilled in the art will easily understand that both the channels 56 and the fins 42 could be different than the ones shown.

FIG. 5 illustrates the interconnection of the base 16 and the casing 18. The base includes an outlet 72 that is in fluid connection with the chamber 54 to allow the warmed cooling liquid to flow from the chamber 54 to the inlet 68 of the casing 18.

It is to be noted that since the base 16 is itself made of heat conducting material, it also absorbs some of the heat of the cooling liquid and increases the thermal inertia of the electric machine 10.

The outlet 70 of the casing 18 is extended by the aperture 74 in the base 16 allowing the cooled cooling liquid to exit the base 16 by the aperture 74 (see arrow 106). Accordingly, a pumping mechanism 108 (schematically illustrated in FIG. 5) may optionally be provided between the outlet 74 and the inlet 43 of the base to create the flow of the cooling liquid in the stator cooling assembly and the cooling arrangement of the casing 18. One skilled in the art will understand that the pumping mechanism 108 could be separate from the electric machine 10 or could be integrated therewith, for example by using a gerotor pump (not shown).

FIG. 5 also illustrates mounting apertures 76 and 78 in the base 16 and casing 18, respectively, allowing the cooling arrangement to be firmly mounted to the base 16.

One skilled in the art will also understand that a supplemental cooling arrangement (not shown) could be associated with the pumping mechanism 108 to allow further cooling of the cooling fluid, externally from the electric machine 10.

It is also to be noted that the configuration of the channels in the liquid cooling arrangement could be different than the longitudinal channels shown herein. Similarly, the configuration of the fins provided on the casing could be different than the one shown and described herein.

Turning now to FIGS. 8 to 11 of the appended drawings, an electric machine 100 according to a second illustrative embodiment will be described. It is to be noted that the casing of the electric machine 100 is not illustrated in FIG. 8. Since the electric machine 100 and the electric machine 10 described hereinabove are similar and for concision purpose, only the differences between these machines will be described hereinbelow.

Figure 8:
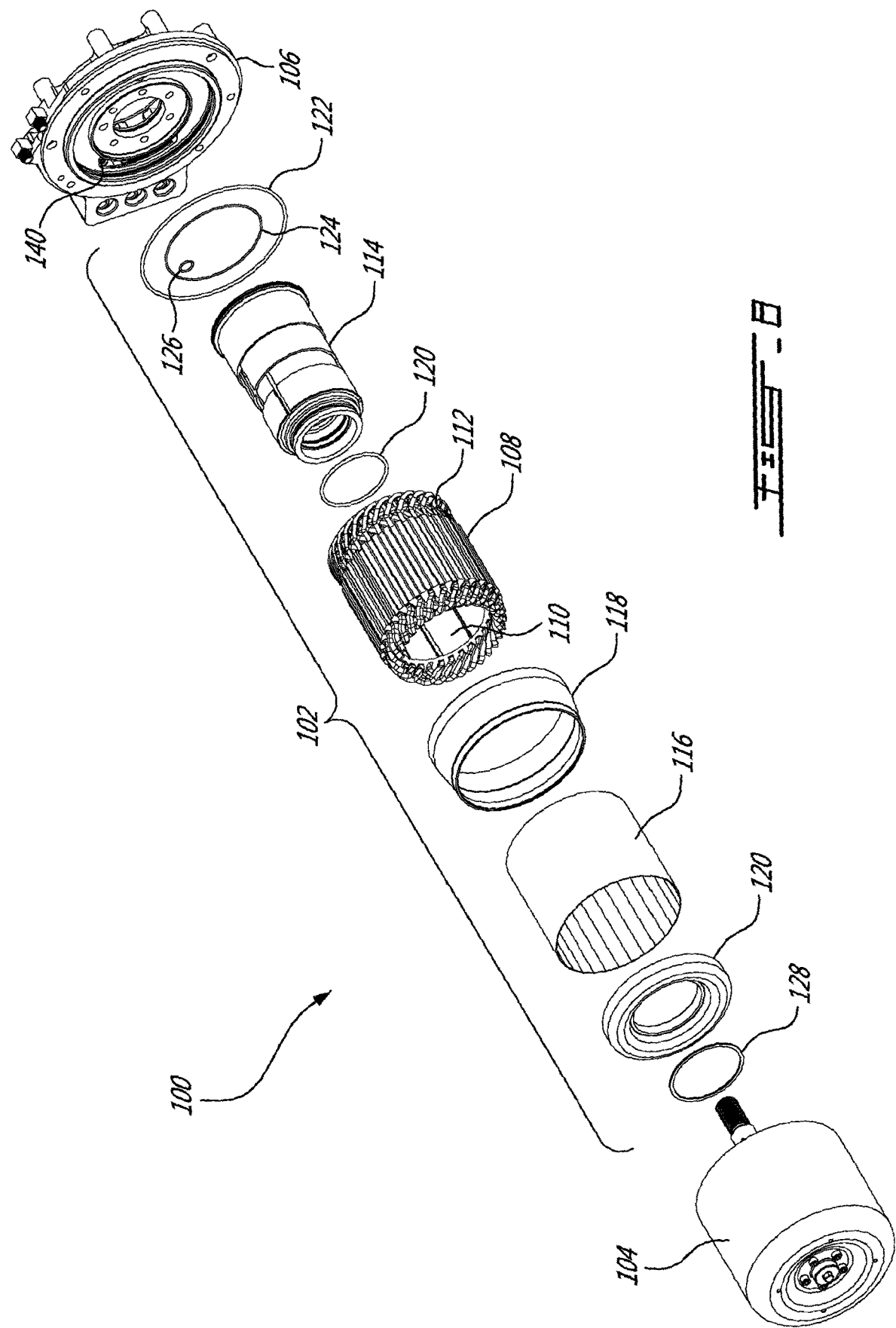
FIG. 8 is an exploded view of an electric machine including an enclosed stator according to a second illustrative embodiment.

FIG. 8 illustrates the electric machine 100 in an exploded perspective view. The machine 100 includes an internal stator 102, a rotor 104 and a base 106.

The internal stator 102 includes a stack of laminations 108 provided with an inner surface 110 and an outer surface having longitudinal coil receiving slots to allow coils 112 to be inserted therein.

The internal stator 102 also includes a stator cooling assembly enclosing the laminations 108 and coils 112. More specifically, the stator cooling assembly includes an internal portion 114 configured and sized as to be inserted in the stack of laminations 108, an external sleeve 116 configured and sized as to be applied to the outer surface of the laminations 108, a connecting element 118 used to imperviously mount the external sleeve 116 to the base 106 and an intermediate portion 120 interconnecting the internal portion 114 to the external sleeve 116 in a fluid tight manner. Of course, O-rings 120-126 and a clip 128 are provided to mount the various elements together and to provide fluid tightness.

From this Figure, one will notice that the coil arrangement of the stator 102 is different from the coil arrangement of the stator 12 since it is constituted of interleaved coils.

One of the differences between the machine 100 and the machine 10 is the shape of the internal portion 114 of the cooling assembly.

Figure 9:
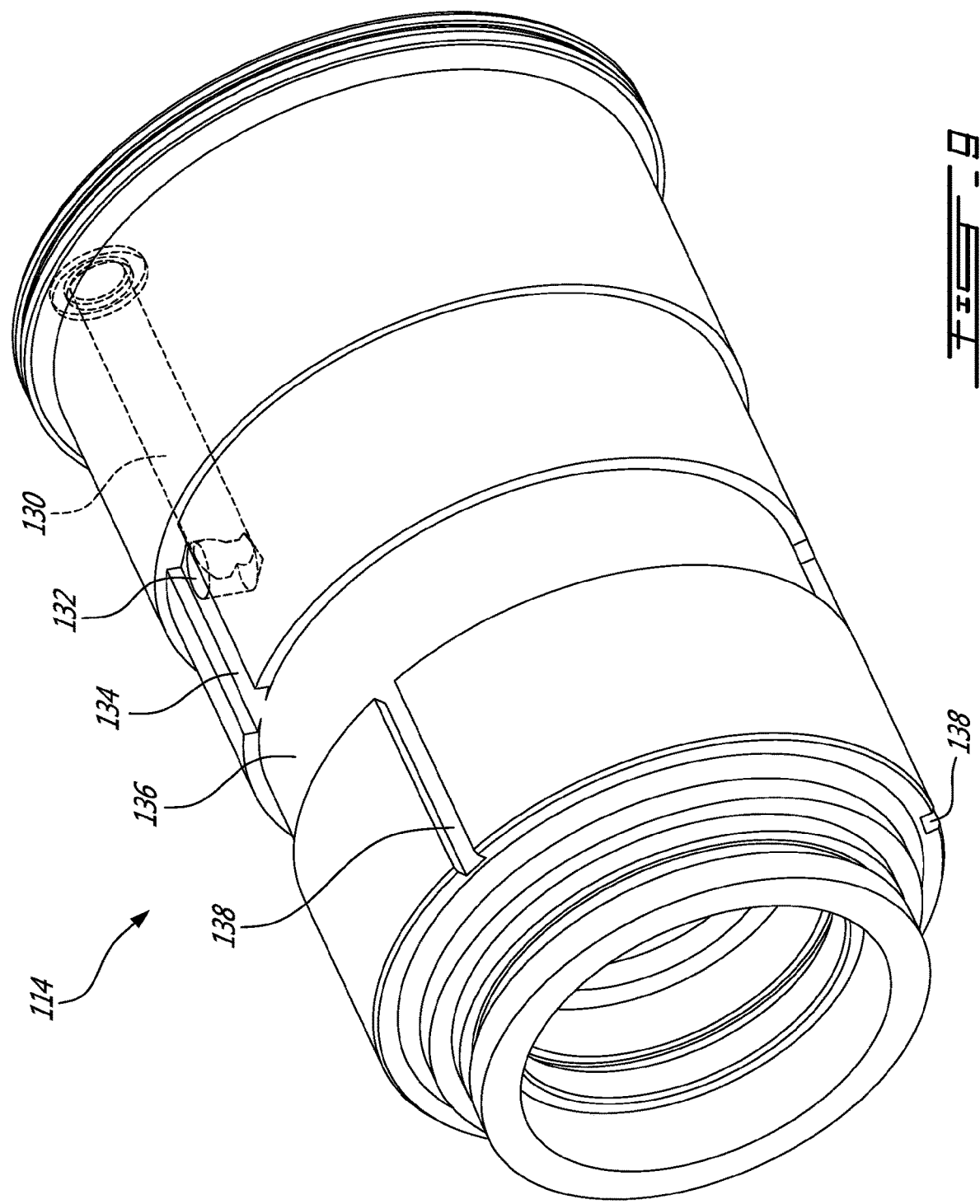
FIG. 9 is a perspective view of the internal portion of the liquid cooling assembly of the electric machine of FIG. 8.
Figure 10:
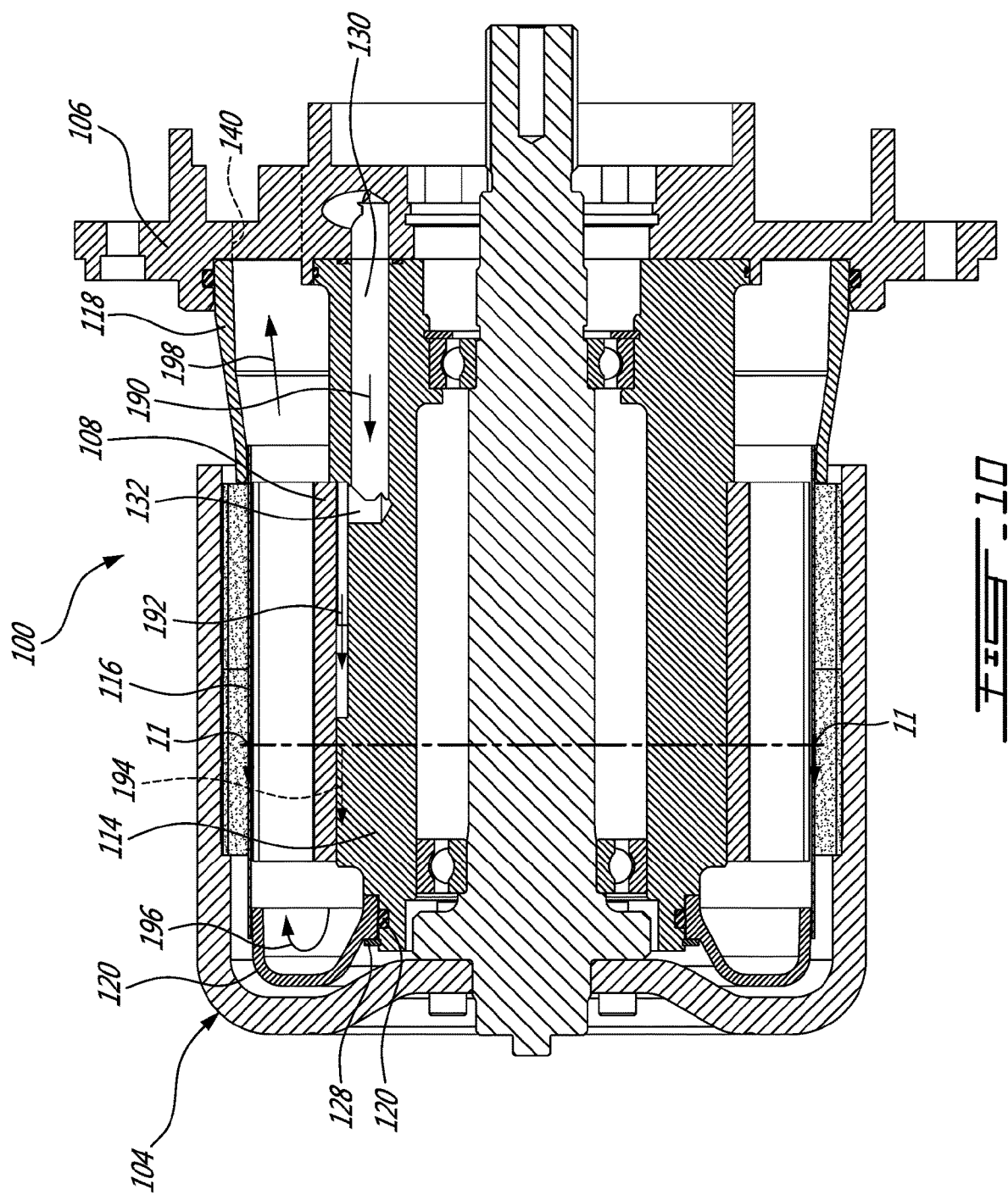
FIG. 10 is a sectional view of the electric machine of FIG. 8, where the casing and the coils have been removed.

FIG. 9 illustrates the internal portion 114 in a perspective view while FIG. 10 illustrates a sectional view of the assembled electric machine 100.

From these figures, the internal portion 114 includes a longitudinal conduit 130 in fluid communication with the base 106 to receive cooling fluid. The conduit 130 leads to a lateral aperture 132 opening to a longitudinal channel 134. A circumferential channel 136 acts as a manifold since it distributes the cooling fluid coming from the channel 134 to the three distal longitudinal channels 138 (only 2 shown on FIG. 9) to thereby allow the cooling fluid to flow from the internal portion 114 to the intermediate portion 120.

As can be seen from FIG. 10, the flow of cooling fluid starts from the base 106, enters the conduit 130 (see arrow 190), goes through the lateral aperture 132, flows between the channel 134 and the inner surface of the stack of laminations 108 (see arrow 192), fills the cavity created by the circumferential channel 136 and the inner surface 110 of the laminations 108, flows through the channels 138 (see arrow 194) before being redirected by the intermediate portion 120 (see arrow 196) to the spaces between the coils and the sleeve 116 and returned to the base 106 via the connecting element 118 (see arrow 198). As will be understood by one skilled in the art, the base includes an aperture 140 receiving the cooling fluid from the connecting element 118.

One skilled in the art will understand that the circumferential channel 136 increases the contact surface between the cooling fluid and the internal surface 110 of the stack of laminations 108 to thereby improve the heat extraction.

Figure 11:
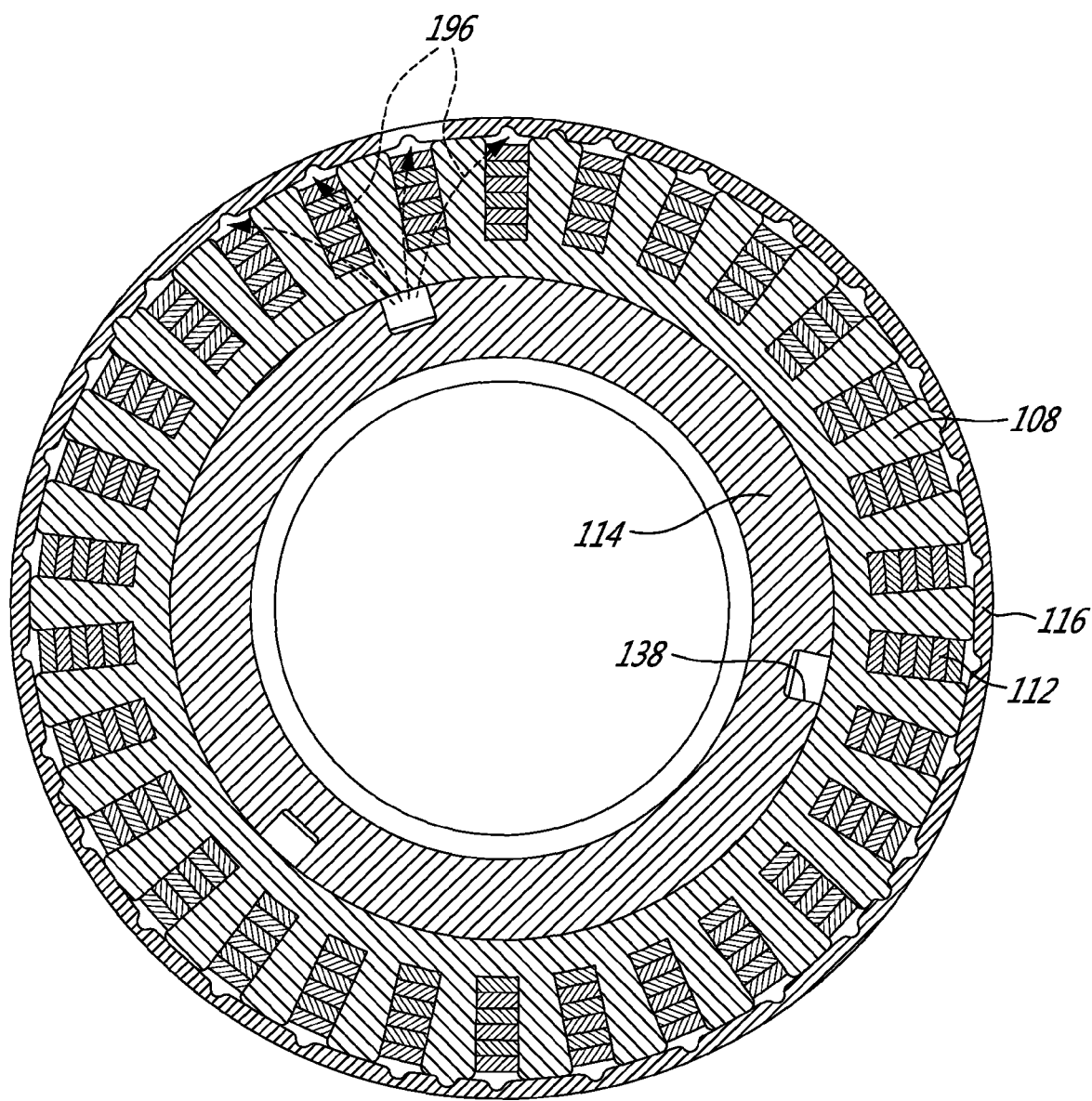
FIG. 11 is a sectional view of the stator taken along line 11-11 of FIG. 10.

Turning briefly to FIG. 11 which is a sectional view taken along line 11-11 of FIG. 10, the flow of cooling fluid between the internal portion 114 and the sleeve 116 is schematically illustrated via arrows 196.

It is to be noted that while a permanent magnet electric machine was described herein, other types of electric machines could benefit from the present teachings.

It is to be understood that the liquid cooled electric machine with enclosed stator is not limited in its applications to the details of construction and parts illustrated in the accompanying drawings and described hereinabove. The liquid cooled electric machine with enclosed stator is capable of other embodiments and of being practiced in various ways. It is also to be understood that the phraseology or terminology used herein is for the purpose of description and not limitation. Hence, although the liquid cooled electric machine with enclosed stator has been described hereinabove by way of illustrative embodiments thereof, it can be modified, without departing from the spirit, scope and nature thereof.

The following numbered clauses are provided as supplemental description.

Clause 1. A liquid cooled electric machine comprising:
an internal stator having an inner surface and an outer surface provided with coil receiving slots;
an external rotor coaxial with the internal stator;
a stator cooling assembly having internal portion in contact with the inner surface of the stator, an external sleeve in contact with the outer surface of the stator to seal the coil receiving slots and an intermediate portion interconnecting the internal portion and the external sleeve; the intermediate portion being so configured as to allow cooling liquid to flow between the internal portion and the coil receiving slots; the stator cooling assembly including an inlet and an outlet.

Clause 2. The liquid cooled electric machine recited in clause 1, further comprising a cooling arrangement to cool the cooling liquid; the cooling arrangement including an inlet associated with the outlet of the stator cooling assembly and an outlet associated with the inlet of the stator cooling assembly.

Clause 3. The liquid cooled electric machine recited in clause 2, further comprising a casing enclosing the internal stator and the external rotor; the cooling arrangement being associated with the casing.

Clause 4. The liquid cooled electric machine recited in any of clauses 2 and 3, further comprising a pumping mechanism interconnecting the inlet of one of the stator cooling assembly and the cooling arrangement to the outlet of the other of the stator cooling assembly and the cooling arrangement to create a liquid flow therebetween.

Clause 5. The liquid cooled electric machine recited in any of clauses 3 and 4, wherein the casing includes external fins.

Clause 6. The liquid cooled electric machine recited in any of clauses 2 to 5, wherein the cooling arrangement includes longitudinal channels provided in the casing, recesses open to adjacent channels and path-forming covers interconnecting adjacent channels when inserted in the recesses.

Clause 7. The liquid cooled electric machine recited in any of the preceding clauses wherein the inlet of the cooling assembly is associated with the internal portion and the outlet of the cooling assembly is associated with the external sleeve.

Clause 8. The liquid cooled electric machine recited in any of the preceding clauses, further comprising a base to which the stator and the stator cooling assembly are mounted.

Clause 9. The liquid cooled electric machine recited in clause 8, further comprising a connecting element interconnecting the external sleeve to the base.

Clause 10. The liquid cooled electric machine recited in clause 9, wherein the inlet of the stator cooling assembly is associated with the internal portion thereof and wherein the outlet of the stator cooling assembly is associated with the connecting element.

Clause 11. The liquid cooled electric machine recited in any of the preceding clauses, wherein the internal portion of the stator cooling assembly includes a cylindrical element having an outer surface provided with a channel defining a manifold and allowing the cooling liquid to contact the inner surface of the stator.

Clause 12. The liquid cooled electric machine recited in any of the preceding clauses, wherein the intermediate portion includes a curved inner surface interconnecting the internal portion and the external sleeve.

Clause 13. The liquid cooled electric machine recited in any of the preceding clauses, further comprising a casing enclosing the internal stator and the external rotor.

The invention claimed is:

1. A liquid cooled electric machine comprising:
    an internal stator having an inner surface and an outer surface provided with coil receiving slots;
    an external rotor coaxial with the internal stator;
    a stator cooling assembly having internal portion in contact with the inner surface of the stator, an external sleeve in contact with the outer surface of the stator to seal the coil receiving slots and an intermediate portion interconnecting the internal portion and the external sleeve; the intermediate portion being so configured as to allow cooling liquid to flow between the internal portion and the coil receiving slots; the stator cooling assembly including an inlet and an outlet.

2. The liquid cooled electric machine recited in claim 1, further comprising a cooling arrangement to cool the cooling liquid; the cooling arrangement including an inlet associated with the outlet of the stator cooling assembly and an outlet associated with the inlet of the stator cooling assembly.

3. The liquid cooled electric machine recited in claim 2, further comprising a casing enclosing the internal stator and the external rotor; the cooling arrangement being associated with the casing.

4. The liquid cooled electric machine recited in claim 2, further comprising a pumping mechanism interconnecting the inlet of one of the stator cooling assembly and the cooling arrangement to the outlet of the other of the stator cooling assembly and the cooling arrangement to create a liquid flow therebetween.

5. The liquid cooled electric machine recited in claim 3, wherein the casing includes external fins.

6. The liquid cooled electric machine recited in claim 3, wherein the cooling arrangement includes longitudinal channels provided in the casing, recesses open to adjacent channels and path-forming covers interconnecting adjacent channels when inserted in the recesses.

7. The liquid cooled electric machine recited in claim 1 wherein the inlet of the stator cooling assembly is associated with the internal portion and the outlet of the stator cooling assembly is associated with the external sleeve.

8. The liquid cooled electric machine recited in claim 1, further comprising a base to which the internal stator and the stator cooling assembly are mounted.

9. The liquid cooled electric machine recited in claim 8, further comprising a connecting element interconnecting the external sleeve to the base.

10. The liquid cooled electric machine recited in claim 9, wherein the inlet of the stator cooling assembly is associated with the internal portion thereof and wherein the outlet of the stator cooling assembly is associated with the connecting element.

11. The liquid cooled electric machine recited in claim 1, wherein the internal portion of the stator cooling assembly includes a cylindrical element having an outer surface provided with a circumferential channel defining a manifold and longitudinal channels allowing the cooling liquid to contact the inner surface of the internal stator.

12. The liquid cooled electric machine recited in claim 1, wherein the intermediate portion includes a curved inner surface interconnecting the internal portion and the external sleeve.

13. The liquid cooled electric machine recited in claim 1, further comprising a casing enclosing the internal stator and the external rotor.

14. A cooling assembly for a stator of an electric machine comprising:
    an internal sleeve in contact with an inner surface of the stator,
    an external sleeve contacting slots in an outer surface of the stator and coils within the slots to form coil coolant flow channels between the slots and the external sleeve, and
    an intermediate portion interconnecting the internal sleeve and the external sleeve;
    the intermediate portion forming a flow channel between the internal sleeve and the coil coolant flow channels.

15. The cooling assembly of claim 14, wherein the outer surface of the stator is circumferential and the slots are longitudinal, and the external sleeve contacts the circumferential outer surface to seal the slots.

16. The cooling assembly of claim 14, wherein the intermediate portion outputs coolant into the coil coolant flow channels.

17. An electric machine comprising:
    a stator having an outer surface containing coil receiving slots;
    coils positioned within the coil receiving slots;
    an rotor coaxial with the stator and external to the stator;
    an internal sleeve in contact with an inner surface of the stator,
    an external sleeve contacting the outer surface of the stator to seal the coil receiving slots forming coil coolant flow channels, and an intermediate portion interconnecting the internal sleeve and the external sleeve;
    the intermediate portion forming a flow channel between the internal sleeve and the coil coolant flow channels and outputting coolant flow into the coil coolant flow channels containing the coils.

18. The electric machine of claim 17, wherein the internal sleeve includes longitudinal coolant channels and a circumferential coolant channel.

19. The electric machine of claim 18, wherein the circumferential coolant channel is connected to each longitudinal coolant channel, receives coolant flow, and outputs the coolant flow to each longitudinal coolant channel.

20. The electric machine of claim 17, wherein each coil coolant flow channel is defined by the coil receiving slots and the external sleeve sealing an open end of the coil receiving slots, and
    each coil coolant flow channel contained two coils.

* * * * *